Sept. 9, 1952 W. A. DOERING ET AL 2,609,913
FRUIT ORIENTATION MACHINE
Filed July 11, 1949 7 Sheets-Sheet 2
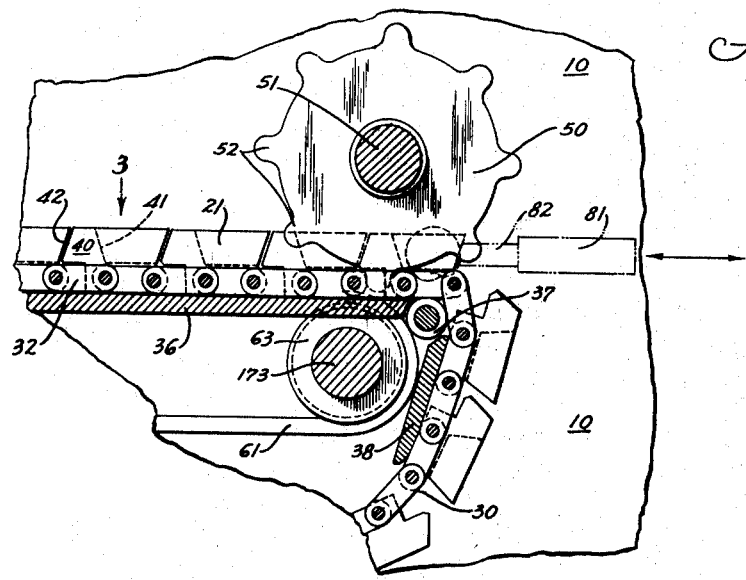
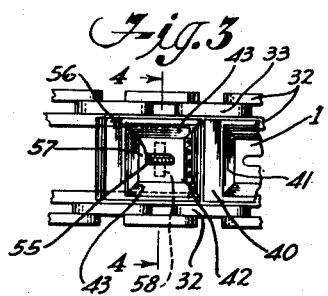
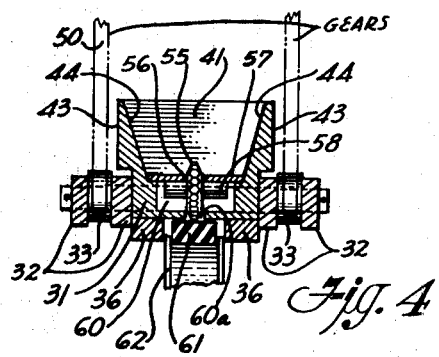
INVENTORS:
WILLIAM A. DOERING
WILLIAM E. KOENIG
BY
Herbert E. Metcalf
Attorney Sept. 9, 1952  W. A. DOERING ET AL  2,609,913
FRUIT ORIENTATION MACHINE
Filed July 11, 1949  7 Sheets-Sheet 3

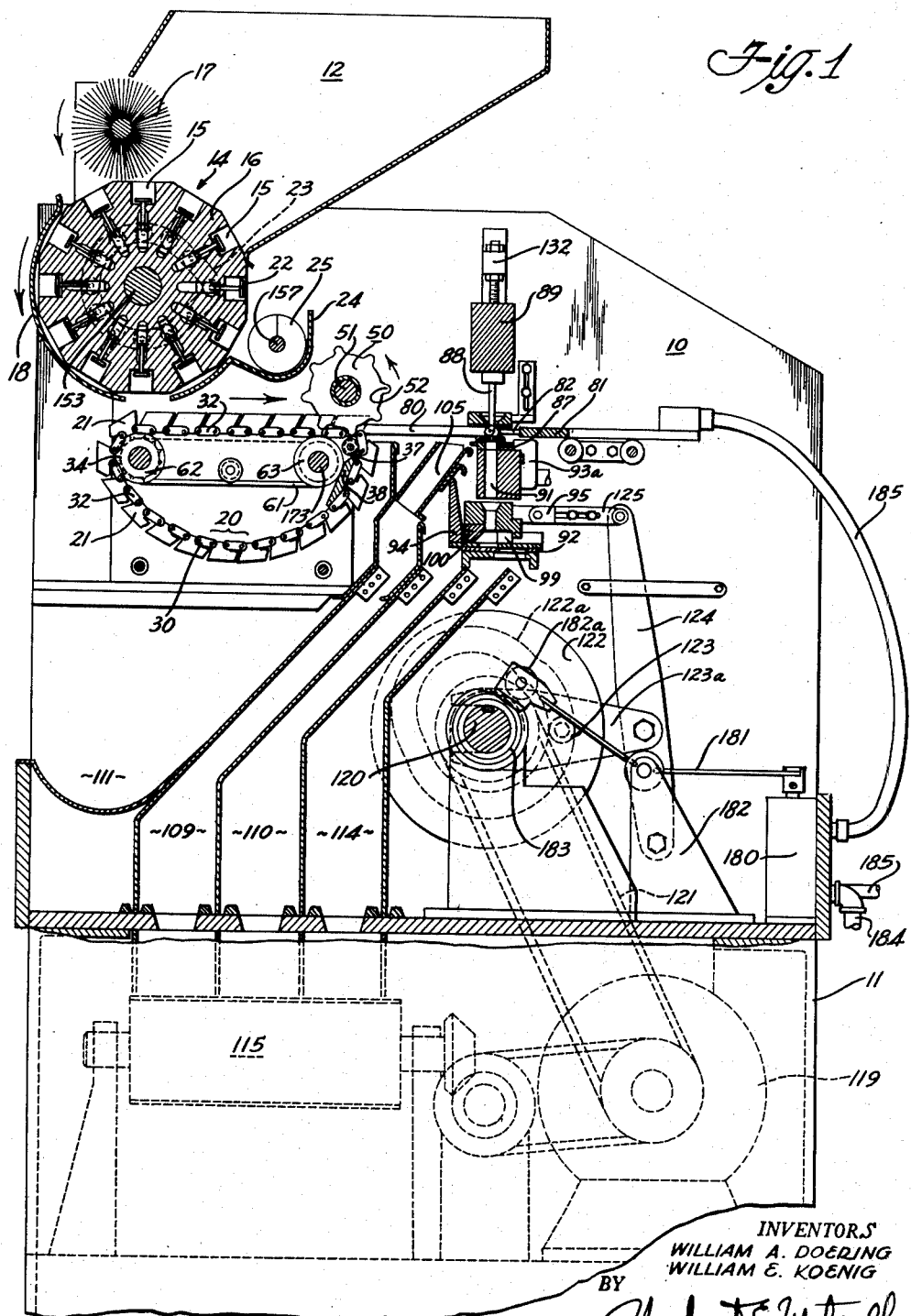

INVENTORS:
WILLIAM A. DOERING
WILLIAM E. KOENIG
BY
Herbert E. Metcalf
Attorney

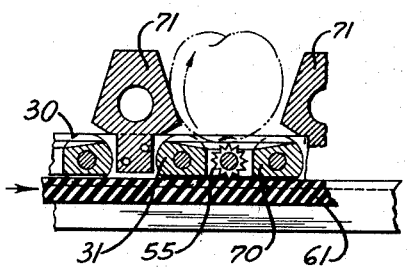
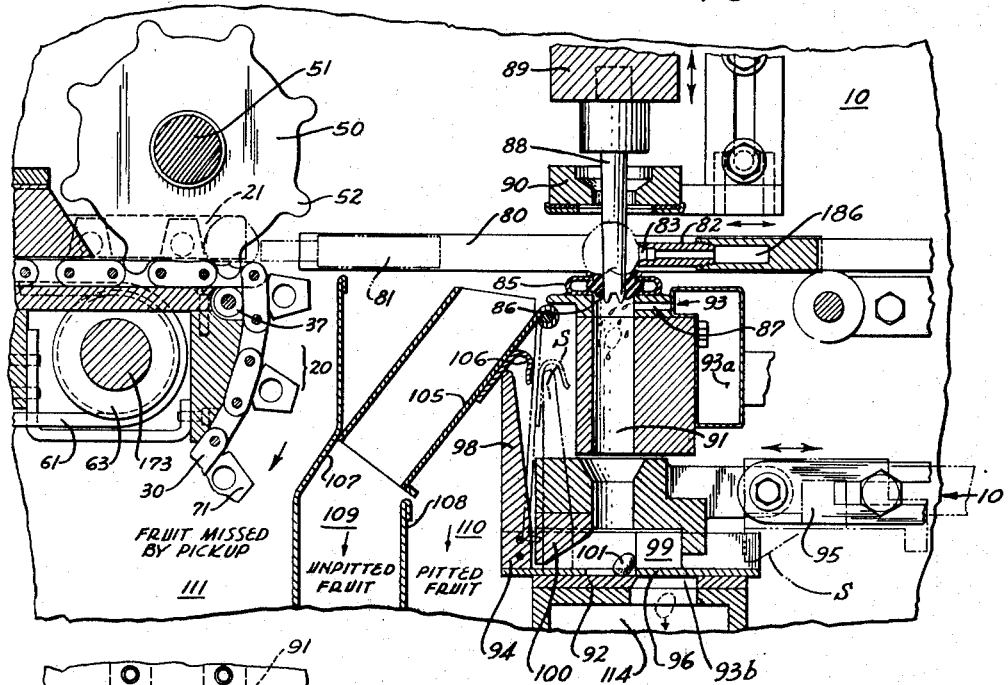
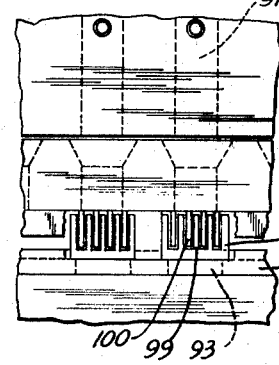
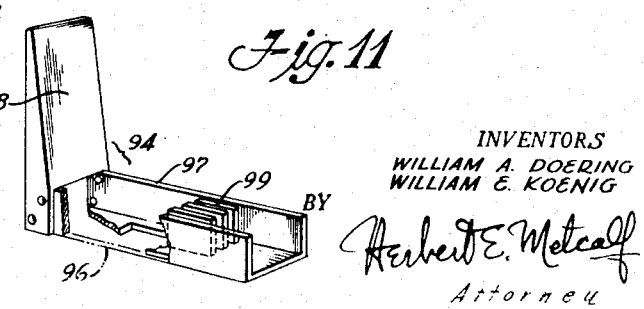

Sept. 9, 1952  W. A. DOERING ET AL  2,609,913
FRUIT ORIENTATION MACHINE
Filed July 11, 1949 7 Sheets-Sheet 5
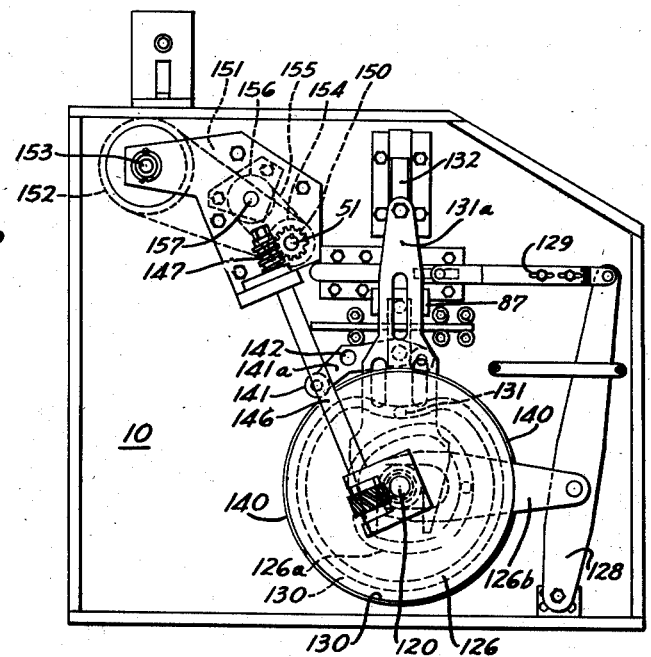
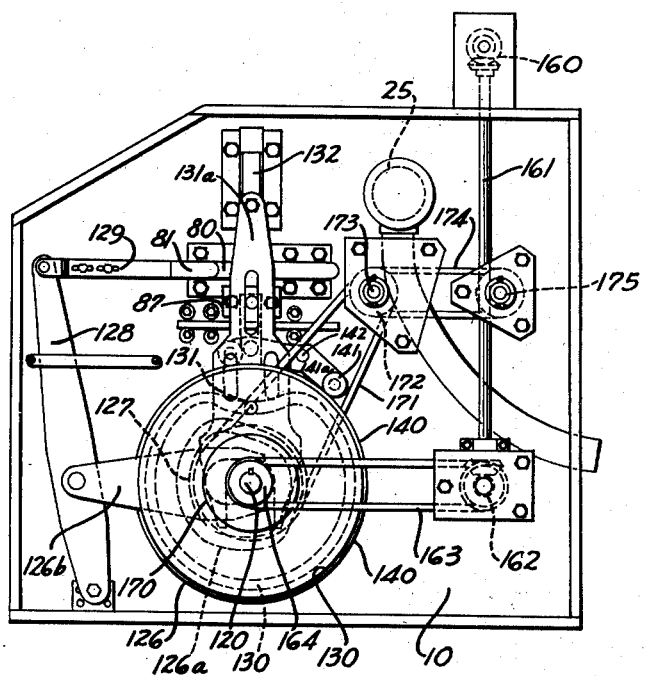
INVENTORS:
WILLIAM A. DOERING
WILLIAM E. KOENIG
BY
Herbert E. Metcalf
Attorney Sept. 9, 1952  W. A. DOERING ET AL  2,609,913
FRUIT ORIENTATION MACHINE
Filed July 11, 1949  7 Sheets-Sheet 6

INVENTORS:
WILLIAM A. DOERING
WILLIAM E. KOENIG
BY
Herbert E. Metcalf
Attorney

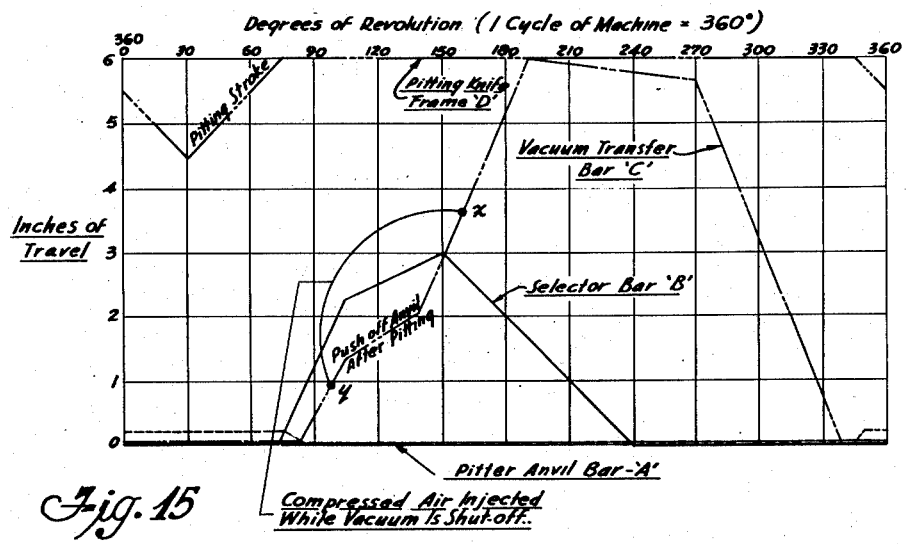

Patented Sept. 9, 1952

2,609,913

UNITED STATES PATENT OFFICE 2,609,913

FRUIT ORIENTATION MACHINE

William A. Doering, Palo Alto, and William E. Koenig, Redwood City, Calif., assignors to S. & W. Fine Foods, Inc., San Francisco, Calif., a corporation of California Application July 11, 1949, Serial No. 104,124

20 Claims. (Cl. 198—33)

This invention relates to fruit orientation machines and more particularly to that type of fruit orientation device wherein the fruit is rotated in a recess by resting on a rotating member positioned adjacent the bottom of the receptacle. This rotating member is shaped to generally fit the stem indent of the fruit so that when the indent and the member register the fruit no longer rotates. With the stem indent in a predetermined position, the fruit can be pitted or otherwise operated on in a uniform manner.

One of the preferred fruit rotating members for use in the above discussed method of orientation is a wheel, as shown, described, and claimed in the United States Patent to Carroll No. 2,220,511, patented November 5, 1940, of which the present invention is an improvement.

In cherry pitting machines in which no orientation takes place, it is customary to deposit the cherries in relatively shallow hemispherical concave recesses in resilient rubber members, with an aperture in the bottom thereof through which the pit of the cherry is forced by the action of a pitting tool moving downwardly through the cherry and aperture. These hemispherical fruit holders are termed in the art "cup-like" receptacles. Thus it was natural, when a wheel was used in the bottom of the cup to orientate the fruit, that cuplike receptacles be used to hold the fruit and when so used the wheel-receptacle combination was successful in orientating a high percentage of fruit to the desired predetermined position.

It has been found, however, that it is possible to greatly improve the shape of the recess in which the fruit is rotated, thereby increasing orientation percentages, and it has been further found, as a result of extensive tests on various shaped fruit holding recesses, that when any type of curved surface is used in the cup against which the cherry is rotated, a greater resistance to rotation of the cherry is offered during orientation than when flat or nearly flat surfaces are used for the recess sides.

As the registry of the stem indent with the wheel rotating the fruit is to some extent a matter of chance depending on the number and type of revolutions of the fruit, and as in commercial pitting machines a high output is desired, anything tending to slow up rotation of the fruit extends the time required for the desired registry. Again, cherries are light and rest with only their own weight on the wheel. The wheel cannot be speeded up indefinitely to rotate the fruit faster, as the frictional drive will slip or the cherry will be bounced in the air, rather than rotate faster. It has been found much more satisfactory to rotate the wheel at a moderate speed and then to reduce resistance to fruit rotation, caused by fruit contact with the recess walls, to a minimum.

It is an object of the present invention to provide a means and method of rotating fruit in a fruit restraining recess with a minimum of recess surface presented to the rotating fruit for contact therewith.

As pointed out above, cherries or like fruits have heretofore been orientated in receptacles having continuously curved surfaces at least in the horizontal and vertical planes. As the diameter of the receptacle at the thrust level is by definition twice the radius of the continuously curved surface, this diameter must necessarily be less than twice the diameter of the fruit being rotated or the fruit will not be held properly over the wheel.

As cherries and similar fruits have only a generally spherical contour, they may have, as part of their peripheral surfaces, many surface areas having radii equal to or even much greater than the radius of the continuously curved receptacles, thus providing a line contact with the thrust surface or, when a hemispherical receptacle is used, even an area contact. The friction of this extended contact plus surface tension effects caused by liquid adhering to the cherry surface often causes the cherry to stop rotating before proper orientation position has been reached. This condition results in a lowered orientation percentage to such an extent that vibration of the receptacle has been resorted to during fruit rotation in an attempt to permit freer rotation of the fruit.

In accordance with the present invention, the effective diameter of the recess can be held to a figure where the fruit is held centrally over the wheel, but the radius of curvature of the thrust walls, both vertically and horizontally, can be made much larger than one-half the effective diameter even up to an infinite radius, i. e., resulting in the use of a flat surface as preferred herein. In consequence, I do not wish to be limited to any particular radius of curvature for the recess defining surfaces except those radii which are substantially larger than one-half the effective recess diameter, which, of course, in the preferred embodiment shown and described herein, is the shortest distance between opposed surfaces in any horizontal plane.

However, as the main rotational friction takes place between the thrust surface and the fruit, the invention can still be efficiently practiced by making this surface only of a radius substantially greater than one-half the effective receptacle diameter, up to infinity. In practice, however, I find it preferable to use a symmetrical receptacle with all wall surfaces flat.

The same reason obtains for the preferable construction for use of a relatively flat instead of curved bottom for the recess; friction is reduced as the cherry contacts the bottom thereof as the indent approaches registry, and there is less chance of the cherry sticking just short of the proper registry.

Tests have shown that, with the preferred flat surfaced receptacles shown and described herein, well over 90% orientation can be regularly achieved, a large number of the fruit in the 10% not oriented being misshapen or malformed fruit which would not under any circumstances become properly orientated by any wheel and recess combination. Thus, a high output with a high percentage of properly orientated fruit is obtained by the use of the present invention.

In a preferred form of the invention, the desired results can be obtained by utilizing a recess member presenting a flat thrust surface to the cherry, against which the cherry is thrown by the wheel during rotation. This surface is preferably positioned to intersect, at all levels, the horizontal planes extending at right angles to the wheel plane. As cherries even in a graded group are not uniform in diameter, I prefer to slope the flat front surfaces toward the wheel. To maintain the cherry against the thrust surface, I preferably provide the recess with sloping flat sides and a sloping rear flat surface to make a recess having, at all levels, a square horizontal section, bigger at the top than at the bottom, and with the wheel centrally positioned in preferably a flat bottom and extending upwardly to contact a fruit in the square section recess. This type of recess may be deemed to have an inverted truncated pyramidal shape. The size of the recess is proportioned to permit the fruit placed therein to freely rotate under drive from the wheel when the peripheral fruit surface is contacted by the wheel, but to settle over the wheel when the wheel registers with the stem indent so that the fruit rotation ceases.

With this type of fruit recess a minimum of contacts will be made with the receptacle walls, and the fruit in general will be limited to a maximum of two such contacts at any one moment, as for example when the cherry is contacting the thrust surface and one or the other of the side walls. Resistance to rotation is greatly reduced and by actual test a higher average percentage of orientation has been obtained using flat surfaces in the fruit recess than when any type or combination of curved surfaces are used as walls of the recess.

One of the problems of orientating fruit by the use of a fruit supporting orientating member that orientates the fruit to place the indent-tip axis of the fruit normal to the bottom of the recess, is that the orientation member is in the way of a pitting knife used to force a pit out of a fruit such as a cherry. Thus, when the fruit is to be pitted in an orientated position, the orientation member must be removed from below the fruit and a pitting support substituted; or, the fruit must be transferred from the recess in which the orientation occurred to a pitting support.

However, when flat surfaces are used for the front, rear and sides of a fruit restraining recess, the members on which such surfaces are formed may be separate members individually relatively movable when mounted on a carrier. When the recess forming members are so mounted it then becomes possible to, for example, remove one end of a recess to permit removal of properly orientated fruit with a straight line motion.

It is another object of the present invention to provide a fruit orientating recess from which properly orientated fruit can be removed with a minimum disturbance of fruit position.

A still further object of the present invention is to provide a simple mode of orientation member drive.

The present invention possesses numerous other objects and features of advantage, some of which together with the foregoing will be set forth in the following description of specific apparatus embodying and utilizing our novel method. It is, therefore, to be understood that our method is applicable to other apparatus, and that we do not limit ourselves in any way to the apparatus shown and described in the present application as we may adopt various other apparatus embodiments utilizing the method within the scope of the appended claims.

In the drawings:

Figure 1 is a view partly in section and partly in elevation taken longitudinally through a preferred embodiment of the present invention.

Figure 2 is a fragmentary side view of the recess separation point of the device of Figure 1.

Figure 3 is a top plan view taken as indicated by the arrow 3 in Figure 2.

Figure 4 is a cross sectional view taken as indicated by the line 4—4 in Figure 3, and rotated 90 degrees counterclockwise.

Figure 8 is a longitudinal sectional view taken as indicated by line 8—8 in Figure 7, and rotated 90 degrees clockwise.

Figure 9 is a longitudinal sectional view of the transfer and pitting mechanisms used in the machines shown in Figures 1 and 5.

Figure 10 is a front-end view taken as indicated by arrow 10 in Figure 9.

Figure 11 is a perspective view of a selector block used in the device of Figure 9.

Figure 12 is a side view taken of the near side of the machines of Figures 1 and 5.

Figure 13 is a side view taken of the far side of the machines of Figures 1 and 5.

Figure 15 is a timing chart applicable for the operation of the machines of Figures 1 and 5.

Figure 5:
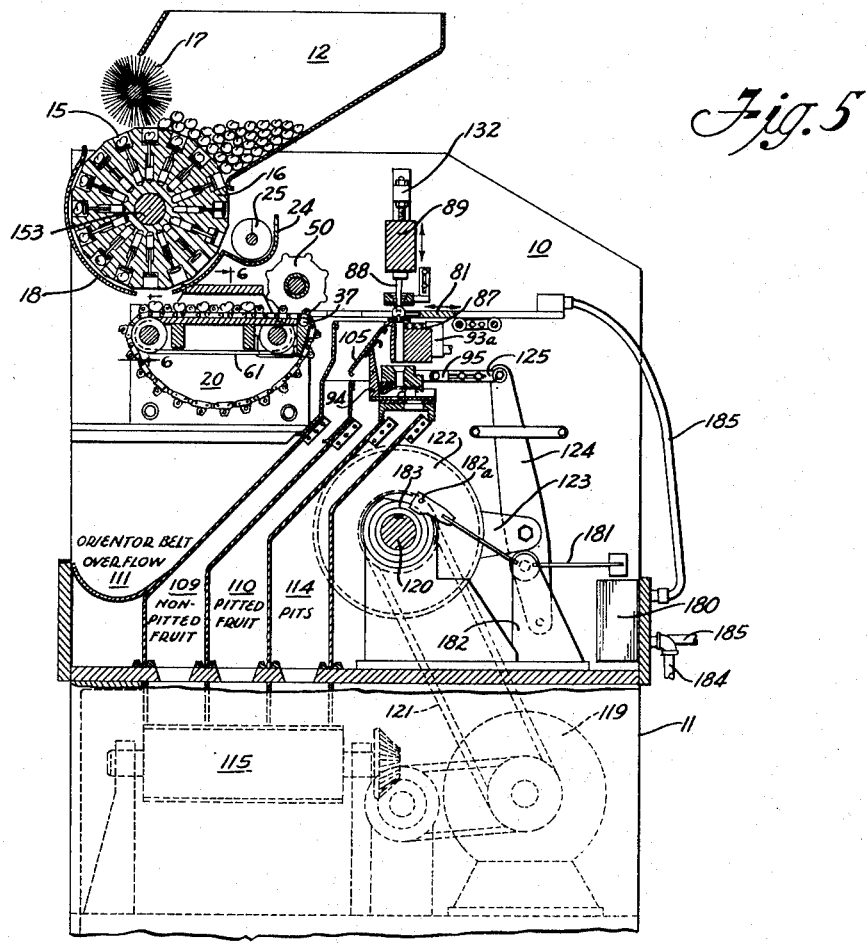
Figure 5 is a reduced sectional view taken as in Figure 1 showing the use of an alternate form of fruit orientating recess.
Figure 6:
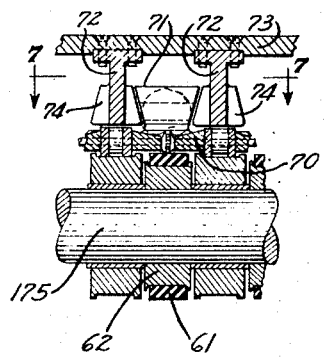
Figure 6 is a cross-sectional view taken as indicated by line 6—6 in Figure 5.
Figure 7:
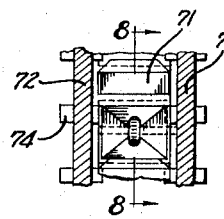
Figure 7 is a top view taken as indicated by line 7—7 in Figure 6.
Figure 14:
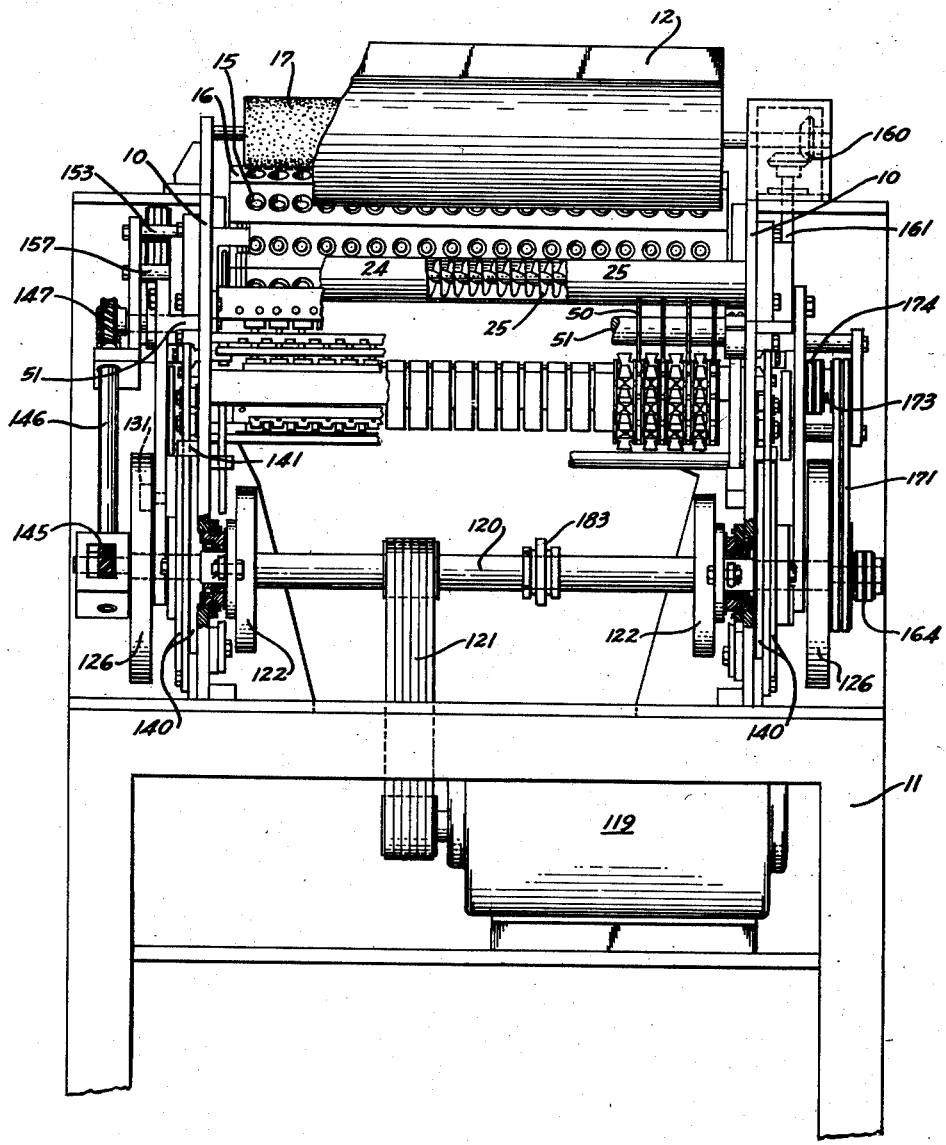
Figure 14 is a front end view of the machine of Figure 1, parts being broken away for clarity.

We refer first to Figures 1, 2, and 3, which show the main features of the machine somewhat diagrammatically for clarity of illustration. Although up to 20 parallel rows of recesses may be used only one row is shown in these figures.

The main structural support of the machine is a pair of spaced upright steel plates 10 mounted on a subframe 11. If only a few parallel orientation rows are to be utilized only a single plate need be used. However, if a larger number of rows are to be utilized, then a plate 10 is used on each side, as will be shown later.

Fruit, such as cherries, to be orientated, are placed in a hopper 12 mounted on top of the side plate 10 and pass through lower hopper opening 14 to fall into fruit receptacles 15 on the periphery of a feed drum 16 rotated counterclockwise, as shown in Figure 1. A brush 17 mounted above drum 16 is also rotated counterclockwise, and bears against the periphery of drum 16 as it rotates, and vents fruit other than the fruit in receptacles 15 from being carried around the drum.

A stationary drum shell 18 is positioned around the drum 16 as the fruit is moved downwardly in receptacles 15, this shell terminating just above a conveyor 20 so that fruit in the receptacles 15 will drop into fruit receiving recess 21 formed by separate parts of the conveyor. In order that fruit that might not drop out of the drum receptacles 15 be removed before the receptacle arrives back at hopper opening 14, each receptacle is provided with an ejector piston 22 that is moved outwardly by a cam 23 to force fruit into a screw conveyor trough 24 from which these fruits are removed laterally by a screw conveyor 25. This construction is particularly valuable when processing cherries, as twin fruits are apt to become forced into the receptacles 15 by the action of brush 17 and thus do not readily drop out of receptacles 15 at the end of drum shell 18.

One type of conveyor construction is shown in Figures 1, 2, 3, and 4. In this embodiment, each conveyor 20 comprises an endless link type chain 30. Base blocks 31 are rotatively connected to adjacent exterior links 32, these latter links being connected by interior links 33.

At a point just below the termination of drum shell 18 the chain 30 passes upwardly over an idling sprocket 34 (Figure 1) and then onto a pair of spaced, horizontal slide bars 36 bearing on the bottoms of base blocks 31. The chain 30 runs a short distance horizontally over slide bars 36 and then breaks sharply around a small roller 37 to cause an abrupt downward shift of chain path. After passing over roller 37 the chain passes over a guide plate 38, and then drops by gravity until it rises to pass again around idling sprocket 34.

The fruit orientating recesses 21 in this particular embodiment are shaped as shown in Figures 2, 3, and 4.

Here, each base block 31 is rearwardly provided with a vertically extending cross bar 40 having front and rear flat, sloping surfaces 41 and 42, respectively, these cross bars extending at right angles to the conveyor path. Side walls 43, having flat, sloping surfaces 44, are also erected from base block 31 extending forwardly to end adjacent the rear surface 42 of the preceding cross bar 40. Thus, each orientation recess 21 has an inverted truncated pyramidal shape, with the crossbar 40 forming the front of one recess and the rear of the preceding recess.

Referring again to Figure 1, the conveyor chain 30 is progressed by an overhead drive gear 50 mounted on gear shaft 51 extending through the side plate 10, the teeth 52 on gear 50 meshing with chain 30 between exterior links 32.

As the conveyor 20 is progressed, orientation of the fruit in the composite recesses is accomplished by a wheel 55 having a serrated edge positioned in each base block 31, to have the wheel periphery extend above the bottom level of the associated recess, the wheel entering the recess through slot 56 in a base plate 57, as shown in Figures 3 and 4. Wheel 55 is mounted on a floating shaft 58, this shaft being free to move vertically in a shaft slot 60. The lower periphery of the wheel 55 extends below the level of base block 31 through a base block opening 60a to contact a driving belt 61.

As shown in Figure 1, belt 61 is mounted on fore and aft pulleys 62 and 63, respectively, and extends from the fruit loading position to a point just below drive gear 50 so that belt 61 contacts all wheels in all recesses that are on the slide bars 36, except the recess that is about to pass around roller 37.

As the orientation recesses 21 pass over the slide bars 36 the wheels 55 are rotated, preferably counterclockwise so that the thrust of the rotating fruit is taken by the front surface 41 of each cross bar, thereby placing the cherry rearwardly in each recess.

As stated above, as each recess reaches the roller 37, the chain 30 starts abruptly downward as shown best in Figure 2. This abrupt change in chain angle places the cross bar of the recess that has passed around the apex of the guide plate 38 completely below and away from the three sides and bottom of the following recess, while the latter recess is still horizontal. This horizontal position is the fruit removal position of each recess, and if desired the teeth 52 of driving gear 50 can be spaced to permit the recess to have a slight dwell in this position for fruit removal, although a pronounced intermittent motion is not necessary.

The composite orientation recess just above described is ideal for fruit that averages spherical in shape. However, certain types of cherries, for example, may have a relatively high percentage of fruit that are elongated along the indent-tip axis. These fruit tend to assume a more or less stable position while being rotated by the wheel 55 with the indent-tip axis at a right angle to the plane of the wheel. When this happens the fruit is not generally orientated properly in the time allotted for orientation. Consequently, it may be desirable to provide means associated with the recesses to turn elongated fruit that is rotating in the above described manner so that elongated fruit can be properly orientated within the allotted time.

One recess arrangement in which this can be accomplished is shown in Figures 5 to 8, inclusive, in conjunction with a multiple row machine. Here, the base blocks 70, themselves, form the interior links of the chains, the exterior links carrying cross bars 71 as separate entities. These cross bars do not have recess sides attached to them. Instead, the recess sides are stationary side bars 72 extended downwardly from a side bar frame 73 positioned above the conveyor. Each stationary side bar 72 is provided with laterally extending turning ribs 74, the inner surfaces of these ribs being sloped, the side bars 72 not being sloped between the ribs. Ribs 74 are oppositely spaced to define sides of the recess normally permitting a cherry to pass through unobstructed if spherical but to touch and turn an elongated cherry when rotating on the wheel with the indent-tip axis crosswise in the recess. The turning action of the ribs 74 thus disturbs the stable position of the cherry so that it is more readily orientated when elongated, and this type of conveyor, with only the wheel-carrying base blocks 70 and the cross bars 71 being progressed between stationary sides, has been found to very materially increase the orientation percentage of elongated fruit therein.

It should, however, be pointed out that side bars 72 do not necessarily have to be stationary. They can be moved or oscillated along the conveyor line if desired. It is desirable only that relative motion be achieved between the conveyor and the side bars 72 in order that a high percentage of orientation be obtained with elongated fruit. Consequently, we do not desire to be limited to the use of stationary side bars.

Furthermore, when the base blocks 70 are placed between the separate cross bars 71 as shown in Figure 8, and where it is desired to carry the sides of the recesses on the conveyor, the sides of the recesses can be attached directly to the base blocks 70 and not to the cross bars as first herein described. In any event, however, each cross bar should be separately mounted on chain 30 so that the forward cross bar may break sharply over roller 37 to open the following recess for fruit removal. When this is done, it is immaterial from a fruit removal point of view whether the receptacle side walls are attached to the cross bars, the bottoms, or whether they are stationary. It will thus be seen that various modifications of the composite recess are adapted to be utilized without modification of the general assembly of the machine.

A fruit transport and pitting mechanism suitable for handling fruit orientated by the devices so far described is shown in Figures 1, 6, and 9 to 14, inclusive, but best shown in Figure 9. This transport and pitting mechanism forms the subject matter of a separate application filed simultaneously with the filing of the present application. Each side plate 10 is provided with a horizontal slot 80 in which a transfer bar 81 is reciprocated. The slot 80 extends from a point near the position of a recess opened for fruit transport, to a pitting station, and transfer bar 81 carries a hollow vacuum pick-up tube 82 extending toward the conveyor 20 and terminating in a flared end 83 facing the opened recess 21. Transfer bar 81 is movable along slot 80 to place flared end 83 of pickup tube 82 in a position where it will closely approach or contact the side of a fruit resting in the opened recess during its slight dwell in this position. At this point vacuum is applied to tube 82 and the fruit is attached by suction to the flared end 83 of the pickup tube 82. Transfer bar 81 then moves to the opposite end of its stroke in slot 80 to place the fruit over a pitting rubber 85 having a central pit aperture 86 therein, this rubber being held in an anvil bar 87. A pitting knife 88 is reciprocated vertically being held in knife frame 89, this knife passing through a stripper plate 90, then through the fruit to force the pit of the fruit through the aperture 86 in rubber 85 to pass through a pit duct 91 in pitting frame 87 to land on a pit plate 92, aided in passage by water from pipe 93 connected to manifold 93a, as shown in Figure 9.

Pit plate 92 is provided with a forward pit discharge opening 93 normally covered by the bottom of a selector slide 94 reciprocable in a horizontal plane.

The selector slide 94 (as shown in Figure 11) comprises an apertured bottom 96, sides 97, upright gate actuator arm 98, and a female comb 99 and slides freely over pit plate 92, being moved directly toward the conveyor by male comb 100 attached to selector bar 95 contacting upright gate actuator arm 98. Selector bar 95 is reciprocated in a horizontal plane by a mechanism yet to be described. Selector slide 94 can be moved away from the conveyor only by a pit 101 resting on pit plate 92 being caught between the male and female combs 100 and 99 on the return stroke of the selector bar 95. Thus, whether or not the selector slide 94 will move away from the conveyor depends upon whether or not there is a pit resting on pit plate 92.

The upright gate actuator arm 98 on the selector slide 94 extends upwardly to contact the bottom of an angularly disposed gate 105 hinged at its upper edge and sloping downwardly, this contact being made inside of hook 106 mounted on gate 105. With the selector slide 94 in its forward position, i. e., toward the conveyor, the gate 105 forms a path between a fixed front channel plate 107 and a fixed rear channel plate 108 into an unpitted fruit chute 109. When the selector slide 94 is moved to the rear by a pit 101 being caught between combs 99 and 100, gate 105 swings downwardly to open a path into a pitted fruit chute 110 at the rear of rear channel plate 108. Front channel plate 107 is spaced from the conveyor a sufficient distance so that fruit not picked up by pickup tube 82 will fall in front of front channel plate 107 into a chute 111 for unpicked-up fruit.

Male comb 100 connected to selector bar 95 is sloped rearwardly and upwardly, so that on the rearward stroke of selector bar 95 (shown by broken line S in rear position), the pit is forced downwardly through the pit discharge opening 93 in pit plate 92 to fall into a pit chute 114. The unpitted fruit, the pitted fruit, and the pits fall on separate portions of an output conveyor 115 through their respective chutes, as shown in Figures 1 and 5.

The output is conveyed laterally, separately collected, and disposed of in a manner in keeping with the character of the collected material.

Clearance for fruit transported by the pickup tube 82 from the opened recess at the transport position, and for unobstructed deposit on the pitting rubber, is provided. It will be noted, as pointed out above, that just before the recess to be opened reaches the transport position, the belt drive for the wheel 55 ceases, due to the belt 61 passing around the rear pulley 63. When this happens, the wheel 55, being free to drop under the urge of gravity, does so, so that when the fruit is moved along the bottom of the recess, the wheel is no longer projecting above the bottom. This action of the wheel 55 prevents the fruit from being rocked off the flared end 83 of the pickup tube 82 as it starts moving away from the opened recess.

Similarly, as the pitting rubber 85 is concave, it is desirable to lower the rubber as the fruit approaches the rubber, and then raise the rubber as the cherry is directly over it, at the rear of the pickup tube travel. This is accomplished by reciprocating the anvil bar 87 vertically in timed relation to the stroke of the transport bar 81 by a sufficient distance so that the fruit will be transported without interference by the anvil bar 87 or rubber 85, and yet will be firmly seated on the rubber when the pitting knife 88 passes downwardly through the fruit to pit the fruit.

The driving mechanism for a multiple row machine shown in Figures 5-8, inclusive, is shown in detail in Figures 1, 5, and 12-14, inclusive. It will be understood, however, that the same driving elements can be utilized to drive the machine shown in Figures 1-4, inclusive, Referring first to Figure 14, a motor 119, preferably having a built-in gear reduction unit, is positioned on subframe 11 and drives a main shaft 120 through a multiple belt 121. Main shaft 120 extends through both side plates 10 below the pitting mechanism, and is used to drive cams positioned adjacent both side plates.

As shown in Figures 1 and 5, mounted on main shaft 120 just inside of plates 10, is a selector cam 122 having a selector cam follower 123 mounted on a follower arm 123a extending horizontally to be attached to a generally vertical selector lever 124. Follower 123 rides in cam groove 122a.

The top of selector lever 124 is attached to selector bar 95 by an adjustable link 125. Thus, the selector bar is reciprocated to provide selection and segregation of the pitted cherries, by directing the pitted fruit into the pitted fruit chute 110.

Mounted just outside of each side plate 10 on main shaft 120 is a composite cam 126 (Figures 12 and 13) in one groove 126a of which a horizontal transfer follower 127 operates, the latter being attached to a horizontal follower arm 126b operating a vacuum transfer lever 128, the top of which is adjustably connected through transfer link 129, to the vacuum transfer bar 81, operating in slot 80 in the side plates 10, so that the pickup tubes 82 are reciprocated to transfer the fruit from the opened recess to the pitting rubber 85.

On composite cams 126, just outside of each vacuum transfer groove 126a, a pitting cam groove 130 has a pitting cam follower 131 bearing thereagainst attached to an upright pitting link 131a, the upper ends of which are attached to pitter bar 132 to which knife frame 89 is fastened. Thus, the pitting knives are reciprocated.

Between each composite cam 126 and plates 10 is an anvil bar cam 140, the peripheries of which are contoured to an anvil bar follower 141. Anvil bar follower 141 is attached to a generally horizontal follower arm 141a, medially pivoted on follower pivot 142, with one end attached to anvil bar 87. Thus, the anvil bar 87 is raised and lowered as fruit transfer is taking place.

Preferably on one side plate 10 only, as shown in Figure 12, the outer end of main shaft 120 is provided with lower worm gears 145 driving a rising worm shaft 146 terminating in upper worm gears 147 driving the gear shaft 51 to which orientator conveyor drive gears 50 are attached. Orientator gear shaft 51 is also provided on one side only (see Figure 12) with a drum drive pulley 150 connected by drum drive belt 151 to a drum shaft pulley 152 mounted on a drum shaft 153 on which feed drum 16 is mounted (see Figures 1 and 5).

Alongside of drum drive pulley 150 is a screw conveyor drive pulley 154 which, through a screw conveyor belt 155 drives a screw conveyor driven pulley 156 attached to a screw conveyor shaft 157 on which screw conveyor 25 is rotated in trough 24 (see Figures 1 and 5).

On the opposite side plate 10 (see Figure 13) brush 17 is rotated by upper brush gears 162, the latter being rotated by a brush belt 163 passing over main shaft brush pulley 164.

The wheel drive belts 61 are rotated by a large wheel drive pulley 170 on the outer end of main shaft 120, a wheel drive main belt 171 passing around the large wheel drive pulley 170 and then around a small wheel drive pulley 172 mounted on a wheel belt shaft 173 on which are mounted the rear wheel belt pulleys 63 which progress the wheel belts 61. Front wheel belt pulleys 62 are rotated by cross belt 174 rotating front pulley shaft 175.

As best shown in Figures 1 and 5, the vacuum for the pickup tubes 82 is under the control of a vacuum valve 180 operated by one end of a valve lever 181 pivoted on a lever bracket 182. The other end of valve lever 181 is a lever follower 182a bearing on a lever cam 183 mounted on main shaft 120. Valve 180 is connected to a vacuum pump (not shown) by vacuum line 184, and to a source of compressed air (not shown) by air line 185. The outlet of the valve is connected to a flexible hose 185 connected to a manifold 186 inside the vacuum transfer bar 81, as shown in Figure 9, to which the pickup tubes 82 are attached. The valve when the main shaft 120 is rotated, thus causes alternate reduction and increase in pressure to take place in the transfer bar manifold 186. The vacuum pump is to have sufficient capacity to have one pickup tube 82 pick up a cherry even though all other pickup tubes are open to the atmosphere.

In the operation of the machine, the motor 119 is started and fruit such as cherries to be pitted are placed in hopper 12 from which the cherries pass individually into the receptacles 15 in the rotating drum 16. Brush 17 insures that only one fruit is in each aperture and that no fruit is jammed between drum 16 and the stationary drum shell 18. The fruit is then carried downwardly by the receptacles 16 to drop into each fruit receiving recess 21 as it arrives at the beginning of the horizontal path of the conveyor. The composite recesses move over the wheel drive belt 61 as the conveyor progresses, the wheels 55 rotate, and the cherries are rotated in the recesses until the stem indent fits over the wheel and ceases to rotate, or until each wheel drops out of the recess as the wheels pass off from the belt just prior to the transfer position.

At the transfer position the cross bar 40 adjacent the sharp bend in the conveyor path passes around this bend, leaving the remainder of the recess undisturbed, with the majority of the cherries resting in properly orientated position on the base blocks 31.

At this time, the flared end 83 of the pickup tube 82 is presented to the side of the cherry, this end moving to a position where it will closely approach or contact the side of a cherry. If the tube touches the cherry, the suction attaches the cherry to the pickup tube. Even if the end of this tube only closely approaches the side of the cherry without touching it, the air rushing into the tube causes the cherry to move slightly to attach itself to the tube. The cherry is then withdrawn from the recess, if picked up, and transported on the end of tube 82 to the pitting mechanism. If not picked up, the fruit is carried around the bend and falls by gravity into the non-pickup chute 110. The progression of the opened recess around the bend opens the next recess and the pickup cycle is repeated.

As the cherry approaches the pitting mechanism on the end of pickup tube 82, the anvil bar 87 drops to permit passage of the cherry, then rises beneath it to seat the cherry on the pitting rubber 85 as the pit is forced out of the cherry and through the hole in the pitting rubber to land on the pit plate 92 aided by water from manifold 93a. The selector slide 94 then operates to control the position of gate 105 so that after the pitting knife 88 clears the fruit on the upward stroke, and the pickup tube 82 starts toward the conveyor again the cherry is pushed and blown by compressed air off the anvil bar 87 and pickup tube 82 to fall into whichever chute the gate 105 has left open, according to whether or not the pit has been removed from the cherry being discharged.

However, all of the moving parts of the machine must be properly timed in order that the proper sequence of operation may be obtained. One timing sequence found satisfactory is shown in the chart of Figure 15.

Here the cycle is shown of one complete revolution (0–360°) of the main shaft 120 and its associated cams in terms of inches of travel. The cycle has been shown to start just prior to pitting, with the anvil bar 87 up, as shown by line A on the chart; with the selector bar 95 stationary, as shown by line B on the chart; with the vacuum transfer bar 81 stationary as indicated by line C; and with the pitting knife 88 moving downwardly as shown by line D.

The vacuum valve 180 is providing maximum negative pressure (suction) at all times except between points $x$ and $y$ on line $c$, where compressed air is injected into tubes 82 through valve 180.

As the cycle proceeds, the pitting knife 88 reaches its full downward stroke at about 30° and starts back upwardly to become stationary at about 75°. Just prior to this point, at about 70°, the selector bar 95 starts moving, and the anvil bar 87 drops. As the anvil bar drops, the vacuum transfer bar 81 moves the pitted cherry back toward the conveyor and pushes it off the pitting rubber 85 and anvil bar 87. At the same time suction is shut off and as the cherry is moved toward gate 105 it is blown off the end of pickup tube 82. In the meantime, the selector bar 95 has moved sufficiently to position gate 105 in accordance with the presence or absence of a pit on pit plate 92. Thus, the cherry is properly segregated in accordance with the result of the action of the pitting knife.

The vacuum transfer bar 81 then continues to move toward the conveyor, and the selector bar 95 moves back to discharge the pit, if present, into pit chute 114. The selector bar then remains stationary until the next cycle. At 160° vacuum is reestablished in the pickup tubes 82.

At about 190°, the vacuum transfer bar 81 reaches the conveyor end of its stroke, and pickup tube 82 is inserted into the opened fruit orientation recess now at the end of the horizontal path of the conveyor, to pick up a cherry in the recess. The direction of the vacuum transfer bar then reverses and the bar starts back toward the anvil bar 87 at the same speed as the recess is being progressed by the carrier. During this synchronous travel the cherry sticks to the flared end 83 of the pickup tube. The motion of the transfer bar 81 is then speeded up to transport the cherry to a point just above the pitting rubber 85, stopping there at about 338°. The anvil bar 87 then immediately rises under the fruit, and the pitting knife 88 starts down at about 345°. The cycle is then repeated.

Thus, each part is connected to give its proper motion when the main shaft is rotated. In one particular embodiment of the device found practical and highly satisfactory for the orientation and pitting of cherries, the stroke of the vacuum transfer bar 81 is six inches horizontally, the pitting knife 88 has a 1½ inch vertical stroke, the anvil bar 87 a vertical stroke of $\frac{5}{32}$ inch, and the selector bar 95 is given a horizontal stroke of three inches, all as indicated in Figure 15.

Thus, with 48 R. P. M. of the main shaft, in one particular embodiment, for example, 48 cherries can be pitted per minute in each carrier row, and with 20 carrier rows, 960 cherries per minute is the complete output. Higher speeds are possible if the fruit is fully graded.

The percentage of orientation in the machine described is high, and the fruit is sorted into four groups: non-loading fruit, mostly twins, from the drum ejectors; fruit not picked up by the transfer mechanism; unpitted fruit, and the desired properly pitted fruit. The overall percentage of the latter will, of course, depend upon the quality of the fruit being processed but can be counted on to contain a very high percentage (well over 90%) of all the fruit physically suitable for proper loading, orientation and pitting. Many runs have been made averaging over 95% overall orientated and pitted cherries.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In a fruit orientation device, a fruit receiving recess formed by a substantially horizontal bottom plate and four cooperating members extending upwardly from said bottom forming a recess having a substantially square cross section at all levels, a fruit contacting wheel projecting through said bottom plate, at least one of said wall members being movable away from the remaining wall members to open said recess and to permit horizontal removal of fruit from said recess.

2. Apparatus in accordance with claim 1 wherein said movable wall member is attached to said bottom to rotate downwardly.

3. Apparatus in accordance with claim 1 wherein three of said wall members and said bottom are solidly attached, the remaining wall member being said movable member.

4. Apparatus in accordance with claim 1 wherein three of said wall members and said bottom are solidly attached, the remaining wall member being said movable member, and wherein said movable member has attached thereto three other wall members and a bottom which, with a second movable member forms a second and duplicate recess.

5. Apparatus in accordance with claim 1 wherein said members are shaped to form an inverted, truncated pyramidal recess.

6. Apparatus in accordance with claim 1 wherein said wheel is slidably mounted in said bottom to move vertically into or out of said recess in accordance with pressure exerted on the bottom of said wheel.

7. In combination, a first pair of spaced wall members, a second pair of spaced wall members at right angles to said first members, said members being positioned to define a fruit restraining recess of substantially square horizontal cross section, fruit revolving and supporting means positioned substantially centrally at the bottom of said recess and positioned to maintain a substantially fixed position with respect to one of said pairs of members, means for driving said fruit revolving member, and means for separating one of said pairs of members to open said recess at one side thereof.

8. In combination, an endless carrier, means for progressing said carrier over a path including a horizontal portion, a plurality of spaced cross bars on said carrier, the front surface of one bar and the rear surface of the next bar forming the front and rear of a fruit restraining recess, a plate positioned between each of said bars and movable with said bars to form the bottom of each of said recesses, a wheel projecting above the top surface of each of said plates, a side member positioned on each side of each bar and extending toward the next bar to complete a plurality of said recesses, belt means contacting the bottom of said wheels for rotating each of said fruit rotating means while in said horizontal path to rotate fruit in said recesses, and means for changing the plane of said carrier to move a bar away from the remainder of said recess at the end of said horizontal path.

9. Apparatus in accordance with claim 8 wherein said wheels are held above the top surfaces of said plates by resting on said belt.

10. Apparatus in accordance with claim 8 wherein said wheels are held above the top surfaces of said plates by resting on said belt, and wherein said belt is shaped to withdraw support of said wheels prior to the change of plane of said carrier.

11. Apparatus in accordance with claim 8 wherein said wheels are held above the top surfaces of said plates by resting on said belt, wherein said belt is shaped to withdraw support of said wheels prior to the change of plane of said carrier, and wherein means are provided in said plate to permit said wheels to drop below the top surface thereof when wheel support is withdrawn.

12. In combination, a carrier having a horizontal path, means for progressing said carrier, a series of fruit recess defining elements having vertically extending substantially flat surfaces thereon, two of said surfaces forming the sides of said recess, the other two of said surfaces forming the ends of said recess supported and progressed by said carrier, a fruit rotating member positioned at the bottom of each recess, means positioned to sharply change the angle of said carrier path downwardly, at least one of said elements having an end surface thereon changing direction prior to the remainder of said elements, thereby opening one side of each of said recesses as they pass said path angle changing means, and means for rotating said fruit rotating member while said recesses are on said horizontal path.

13. Apparatus in accordance with claim 12 wherein said recess defining elements are shaped to provide fruit receiving recesses having said flat surfaces defining a recess of inverted truncated pyramidal shape.

14. Apparatus in accordance with claim 12 wherein said recess defining elements are shaped to provide fruit receiving recesses having flat surfaces defining a recess of inverted truncated pyramidal shape, and wherein a single one of said elements has surfaces defining a portion of two adjacent recesses.

15. Apparatus in accordance with claim 12 wherein said recess defining elements are shaped to provide fruit receiving recesses having flat surfaces defining a recess of inverted truncated pyramidal shape, wherein a single one of said element has surfaces defining a portion of two adjacent recesses, and wherein said single element is connected to said carrier to change direction prior to the remaining elements to open a recess.

16. In combination, an endless carrier having a plurality of hinged links, means for progressing said carrier over a path including a horizontal path, means positioned at the end of said horizontal path for sharply changing the path of said carrier downwardly link by link, elements defining a fruit restraining recess mounted on said carrier, elements defining the back, bottom, and sides of one recess being mounted on one link and an element defining the front of the following recess being mounted on an immediately preceding link.

17. Apparatus in accordance with claim 16 wherein said elements are shaped to form recesses of inverted truncated pyramidal shape and wherein means are provided to support and rotate fruit in said recesses while traversing said horizontal path.

18. Apparatus in accordance with claim 16 wherein said elements are shaped to form recesses of inverted truncated pyramidal shape, wherein means are provided to support and rotate fruit in said recesses while traversing said horizontal path, and wherein means are provided to remove fruit support by said fruit rotating means prior to change in direction of the path of said carrier.

19. In combination, an endless carrier having a plurality of hinged links, means for progressing said carrier, a plurality of cross bars carried on alternate links of said carrier, each of said cross bars having a surface forming the rear of a fruit receiving recess and having a surface forming the front of a following fruit receiving recess, elements defining fruit recess side walls attached to each cross bar and extending forwardly to the preceding cross bar, a fruit recess bottom carried by a link and positioned between said cross bars, a wheel mounted on each of said bottoms and projecting above the top surfaces thereof, and means for rotating said wheels while said bottoms are being progressed.

20. In combination, an endless carrier having a plurality of hinged links, means for progressing said carrier over a horizontal path, a plurality of cross bars carried on alternate links of said carrier, each of said cross bars having a surface forming the rear of a fruit receiving recess and having a surface forming the front of a following fruit receiving recess, elements defining fruit recess side walls attached to each cross bar and extending forwardly to the preceding cross bar, a fruit recess bottom carried by a link and positioned between said cross bars, a wheel mounted on each of said bottoms and projecting above the top surfaces thereof and below the bottom thereof, an endless belt having an extent parallel to said horizontal path and simultaneously contacting a plurality of wheels at the bottom thereof, and means for moving said belt.

WILLIAM A. DOERING.
WILLIAM E. KOENIG.

REFERENCES CITED

The following references are of record in the file of this patent:

UNITED STATES PATENTS

| Number | Name | Date |
|---|---|---|
| 2,220,511 | Carroll | Nov. 5, 1940 |
| 2,296,490 | Ashlock | Sept. 22, 1942 |
| 2,298,614 | Carroll | Oct. 13, 1942 |
| 2,308,039 | Ashlock | Jan. 12, 1943 |
| 2,341,857 | Drake | Feb. 15, 1944 |